United States Patent [19]

Irii et al.

[11] Patent Number: 6,114,453

[45] Date of Patent: *Sep. 5, 2000

[54] COVERING MATERIAL COMPOSITION FOR GOLF BALL AND PROCESS FOR PRODUCING THE SAME

[75] Inventors: Daisuke Irii; Yoshihiro Inomata; Gou Kawaguchi, all of Hiratsuka, Japan

[73] Assignee: The Yokohama Rubber Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/877,199

[22] Filed: Jun. 17, 1997

[30] Foreign Application Priority Data

Jun. 18, 1996 [JP] Japan .................................. 8-157045
Aug. 20, 1996 [JP] Japan .................................. 8-218640

[51] Int. Cl.⁷ ........................................... C08L 33/02
[52] U.S. Cl. ..................... 525/221; 525/192; 473/378; 473/385
[58] Field of Search .................... 473/378, 385; 525/201, 221

[56] References Cited

U.S. PATENT DOCUMENTS

| | | |
|---|---|---|
| 5,298,571 | 3/1994 | Statz . |
| 5,407,998 | 4/1995 | Horiuchi .................................. 525/221 |
| 5,733,974 | 3/1998 | Yamada .................................. 473/385 |

FOREIGN PATENT DOCUMENTS

| | | |
|---|---|---|
| 061871 | 2/1992 | Japan . |
| 112375 | 5/1996 | Japan . |
| 141113 | 6/1996 | Japan . |

*Primary Examiner*—David J. Buttner
*Attorney, Agent, or Firm*—Arent Fox Kintner Plotkin & Kahn, PLLC

[57] ABSTRACT

A covering material composition for a golf ball, which comprises an ionomer resin and a diene rubber, the diene rubber being dispersed in the ionomer resin. The covering material composition is produced by mixing the ionomer resin with the diene rubber to disperse the diene rubber in the ionomer resin.

7 Claims, No Drawings

COVERING MATERIAL COMPOSITION FOR GOLF BALL AND PROCESS FOR PRODUCING THE SAME

BACKGROUND OF THE INVENTION

The present invention relates to a covering material composition for a golf ball, which has excellent resilience, durability and appearance and which also realizes a soft feeling, equivalent to that of a wound golf ball, when the ball is struck and a process for producing the composition.

Ordinary golf balls are classified into wound golf balls and two-piece golf balls. The two-piece golf balls are composed of a core made from a rubber composition and a cover material made from, for example, an ionomer resin (an ionic ethylene copolymer resin), excellent in the impact resistance and resilience, covering the core. Since the two-piece golf balls have a long carry and excellent durability, they are used by many golfers. However, as for the feeling realized by striking the golf balls, many golfers are fond of a soft feeling realized by striking the wound golf balls; the feeling realized by the two-piece balls is hard. Recently the development of a two-piece golf ball which realizes a soft feeling like that of the wound golf balls has been demanded.

In order to obtain the soft feeling upon the striking by softening the two-piece golf ball, a soft ionomer resin mixture of an ionomer resin having a high hardness and another ionomer resin having a low hardness is used as the covering material for the golf ball (Japanese Patent Laid-Open Nos. 308577/1989 and 3931/1993); or a rubber or elastomer selected from among various kinds of them is blended in the covering material (Japanese Patent Laid-Open Nos. 79017/1994, 359025/1992, 78855/1986, 36347/1986 and 133440/1980, and U.S. Pat. No. 3,454,676). However, since the impact resilience of the ionomer resins is reduced as the hardness of them is reduced, the soft ionomer resin mixture obtained by mixing the ionomer resin of a high hardness with the ionomer resin of a low hardness and a low impact resilience has a reduced resilience. Another problem caused by the blending of the materials different from each other is that the durability and the appearance of the buffed golf ball are damaged by the blending.

SUMMARY OF THE INVENTION

The object of the present invention is to provide a covering material composition for a golf ball, which has excellent resilience, durability and appearance and which also realizes a soft feeling, equivalent to that of a wound golf ball, when the ball is struck and a process for producing the composition.

For attaining the above-described object, the covering material composition for a golf ball according to the present invention is characterized by comprising an ionomer resin and a diene rubber, the diene rubber being dispersed in the ionomer resin.

The process of the present invention for producing the covering material composition for a golf ball is characterized by mixing the ionomer resin with a non-crosslinked diene rubber to disperse the crosslinked diene rubber in the ionomer resin.

DESCRIPTION OF THE PREFERRED EMBODIMENTS (1) Ionomer Resin

The ionomer resins comprise an ethylene/unsaturated carboxylic acid copolymer as the base resin, and is produced from, for example, an ethylene/unsaturated carboxylic acid copolymer and a metal compound capable of feeding a cation.

The ethylene/unsaturated carboxylic acid copolymer is, for example, a copolymer of ethylene and an unsaturated carboxylic acid having 3 to 6 carbon atoms such as acrylic acid, methacrylic acid, maleic acid, fumaric acid or vinyl benzoate.

The metal compounds capable of feeding a cation include, for example, formates, acetates, nitrates, carbonates, hydrogencarbonates, oxides, hydroxides and alkoxides of alkali metals, alkaline earth metals and transition metals. The metals are Na, Zn, Li, Mg, Mn, Ca, Co, K, etc.

The Shore D hardness of the ionomer resin is preferably at least 55 and below 80 ($55 \leq$ Shore D hardness $< 80$). The reason why the Shore D hardness is limited to at least 55 is that the higher the hardness of the ionomer resin, the higher the impact resilience thereof. When the Shore D hardness is 80 or above, the effect of the incorporated diene rubber cannot be exhibited and the feeling realized by striking the obtained golf ball is excessively hard.

The ionomer resins include, for example, metal salts of a copolymer of ethylene and methacrylic acid. The ionomer resins may be those available on the market such as Himilan 1605, Himilan 1706, Himilan 1705, Himilan 1707, Himilan AM 7315, Himilan AM 7317 and Himilan AM 7318 (products of Du Pont-Mitsui Polychemicals Co., Ltd.); and Surlyn 7930 and Surlyn 7940 (products of Du Pont Company).

(2) Diene Rubber

Natural rubbers, butadiene rubbers, isoprene rubbers, styrene-butadiene copolymer rubbers, ethylene-propylene-diene copolymer rubbers, acrylonitrile-butadiene copolymer rubbers, etc. are usable as the diene rubbers. Among them, butadiene rubbers are preferably used. The butadiene rubbers available on the market are usable herein, and those comprising at least 40% of cis-1,4-structure are preferred.

(3) Composition of Covering Material for Golf Ball of the Present Invention

In the composition comprising the ionomer resin and the diene rubber, the diene rubber is dispersed in the ionomer resin. The composition preferably comprises 50 to 90 parts by weight of the ionomer resin and 10 to 50 parts by weight of the diene rubber. When the amount of the ionomer resin is below 50 parts by weight, the hardness of the composition of the covering material is reduced and the feeling obtained by striking the golf ball becomes excessively soft and, on the contrary, when it exceeds 90 parts by weight, the softening by the diene rubber is insufficient for realizing the soft feeling by the striking.

In the composition of the covering material, the diene rubber having a particle size of not larger than 5 μm, preferably 0.1 to 5 μm, is dispersed in the ionomer resin. When the particle size is larger than 5 μm, the surface of the covering material of the golf ball becomes fluffy in the buffing step before the step of coating the golf ball or the durability of the ball is reduced.

The ionomer resin and diene rubber in the covering material composition of the present invention are preferably such that the ratio of the viscosity of the diene rubber to the viscosity of the ionomer resin at the mixing temperature of the ionomer resin and diene rubber (diene rubber/ionomer resin) is in the range of 1/1 to 5/1 because the diene rubber having a particle size of not larger than 5 μm is difficultly dispersed in the ionomer resin when the viscosity ratio of them is not within this range.

In the covering material composition of the present invention, the diene rubber dispersed in the ionomer resin is preferably crosslinked by heat. The term "crosslinking by heat" herein indicates the crosslinking of the non-crosslinked diene rubber only by heat without using any crosslinking agent (the crosslinking is conducted only by heating). The crosslinking by heat is conducted more easily by reducing the size of the particles of the diene rubber dispersed in the ionomer resin to not larger than 5 μm. When the diene rubber is not crosslinked by heat, the resilience, durability and appearance of the covering material are not excellent. The term "impairment of the appearance" herein indicates that the covering material becomes fluffy to impair the appearance of the golf ball.

When the non-crosslinked diene rubber is crosslinked with an organic peroxide as the crosslinking agent, the ionomer resin is also crosslinked at the same time to seriously lower the fluidity of the covering material composition comprising the ionomer resin and the diene rubber and also to make the molding impossible. When the non-crosslinked diene rubber is crosslinked with a sulfur vulcanizing agent, the covering composition is colored yellow to reduce the commercial value of the composition. On the contrary, when the crosslinking is conducted only by heat without using any crosslinking agent, the above-described problems are not caused. In particular, the resilience is improved when the crosslinking is conducted only by heat as will be shown in Examples given below as compared with the resilience obtained by the crosslinking with the sulfur vulcanizing agent.

The covering material composition of the present invention preferably has a tan δ of not above 0.07, preferably 0.01 to 0.07 at 0° C. By thus controlling the tan δ at 0° C. at not above 0.07, the resilience of the obtained golf ball can be further improved. The tan δ at 0° C. can be controlled at not above 0.07 by, for example, using the ionomer resin having a high hardness and the diene rubber having a low glass transition temperature (Tg). As for the hardness of the covering material composition, it preferably has a Shore D hardness of 45 to 62.

(4) Process of the Present Invention for Producing the Covering Material Composition for Golf Ball The covering material composition is produced by mixing the above-described ionomer resin with the non-crosslinked diene rubber to disperse the crosslinked diene rubber in the ionomer resin. The mixing ratio, in terms of parts by weight, of the ionomer resin to the non-crosslinked diene rubber is preferably 50 to 90/10 to 50. The particle size of the diene rubber dispersed in the ionomer resin is not larger than 5 μm, preferably 0.1 to 5 μm.

Concretely, the covering material composition can be produced by the following process (a) or (b):

(a) The covering material composition is produced by mixing the ionomer resin with the non-crosslinked diene rubber by mixing them in the range of 130° C. to 260° C., the ratio of the viscosity of the diene rubber to the viscosity of the ionomer resin at the mixing temperature of the ionomer resin and diene rubber (diene rubber/ionomer resin) being in the range of 1/1 to 5/1. The diene rubber having a particle size of not larger than 5 μm can be thus dispersed in the ionomer resin. Most of crosslinking agents (vulcanizing agents) for the non-crosslinked diene rubber are usable, but the organic peroxide is not usable.

When the viscosity ratio is higher than 5/1, the difference in the viscosity between the ionomer resin and diene rubber is too large for obtaining a shearing force enough for the mixing and, therefore, the dispersion of the fine diene rubber particles becomes impossible. On the contrary, when the viscosity ratio is below 1/1, the viscosity of the ionomer resin is higher than that of the diene rubber to make the mixing impossible, since the ionomer resin is finely dispersed in the diene rubber, to the contrary, in the obtained structure. The mixing is conducted at a shear rate of at least 1,000/sec. When the shear rate is below 1,000/sec, the particle diameter of the diene rubber cannot be reduced to 5 μm or smaller. The mixing machine used for the mixing is preferably a twin-screw extruder.

(b) The covering material composition is produced by mixing the ionomer resin with the non-crosslinked diene rubber at a temperature of 150° C. to below 260° C., the ratio of the viscosity of the diene rubber to the viscosity of the ionomer resin at the mixing temperature of the ionomer resin and diene rubber (diene rubber/ionomer resin) being preferably in the range of 1/1 to 5/1, to crosslink the diene rubber by heat and also to disperse it in the ionomer resin. The mixing is preferably conducted by mixing at a shear rate of at least 1,000/sec in the mixer. By the mixing, the diene rubber is homogeneously dispersed in the ionomer resin and, in addition, the particle size of the dispersed diene rubber can be made as small as not larger than 5 μm to further accelerate the thermal crosslinking of the diene rubber.

A mixing temperature of below 150° C. is too low for the thermal crosslinking of the diene rubber. At such a low mixing temperature, the resilience, durability and appearance of the product are unsatisfactory. When the mixing temperature is 260° C. or above, the diene rubber is deteriorated by heat and the obtained resilience, durability and appearance are unsatisfactory.

(c) The covering material composition for a golf ball of the present invention may suitably contain another rubber as well as an elastomer, a filler, a pigment, a processing aid, a stabilizer, etc. The stabilizer is added preferably after the completion of the mixing of the diene rubber with the ionomer resin or in the final stage of the mixing because when it is added before the mixing of the diene rubber with the ionomer resin, the thermal crosslinking of the diene rubber is inhibited.

The tan δ at 0° C. of the covering material composition is not higher than 0.07, preferably 0.01 to 0.07. The hardness of the covering material composition is a Shore D hardness of 45 to 62.

EXAMPLES AND COMPARATIVE EXAMPLES

① According to the compounding prescription (parts by weight) shown in the upper column in each of Tables 1 and 2, the components were melt-mixed with a twin-screw extruder (mixer) at a shear rate of 2,000/sec at a temperature of 180° C.

The golf balls were produced by covering each solid core having a diameter of 38.3 mm and a compression value at 2.54 mm deformation of 80 kgf with the obtained composition (Examples 1 to 8, Comparative Examples 1 to 7) by the injection molding to form a covering layer having a thickness of 2.2 mm. The resilience, durability, feeling realized by striking the golf ball and the appearance of the ball were evaluated to obtain the results given in Tables 1 and 2.

TABLE 1

| | Example | | | | | | | |
|---|---|---|---|---|---|---|---|---|
| | 1 | 2 | 3 | 4 | 5 | 6 | 7 | 8 |
| Himilan 1605*1 | 90 | 80 | 70 | | | 80 | 80 | 80 |
| Himilan 1706*2 | | | | 80 | | | | |
| Himilan 1705*3 | | | | | 80 | | | |
| JSR BR01*4 | 10 | 20 | 30 | 20 | 20 | | | |
| Nencis BR60*5 | | | | | | 20 | | |
| Cariflex BR-1220V*6 | | | | | | | 20 | |
| Nipol IR-2200L16 | | | | | | | | 20 |
| Titanium dioxide | 1 | 1 | 1 | 1 | 1 | 1 | 1 | 1 |
| Vulcanizing agent*7 | 0.9 | 1.8 | 2.7 | 1.8 | 1.8 | 1.8 | 1.8 | 1.8 |
| Mixer | twin-screw | twin-screw | twin-screw | twin-screw | twin-screw | twin-screw | twin-screw | twin-screw |
| Viscosity ratio*8 | 1.6 | 1.6 | 1.6 | 1.3 | 2.4 | 2.3 | 1.1 | 3.5 |
| Particle size diene rubber ($\mu$m)*9 | 1 | 2 | 3 | 2 | 3 | 3 | 1 | 5 |
| Hardness of covering material*10 | 59 | 55 | 51 | 54 | 55 | 54 | 55 | 58 |
| tan $\delta$ (0° C.)*15 | 0.045 | 0.048 | 0.050 | 0.062 | 0.055 | 0.048 | 0.047 | 0.050 |
| Resilience index*11 | 102.1 | 101.9 | 101.4 | 101.6 | 101.6 | 102.1 | 101.4 | 101.0 |
| Durability index*12 | 100 | 110 | 120 | 105 | 115 | 120 | 105 | 105 |
| Feeling realized by striking*13 | soft | soft | soft | soft | soft | soft | soft | soft |
| Appearance*14 | good | good | good | good | good | good | good | good |

Resilience index and durability index of Examples 1 to 8 were shown respectively in comparison with Comparative Example 1 having each index of 100.

Notes)
*1 Ethylene/methacrylic acid copolymer having sodium ion; Shore D hardness: 67 (a product of Du-Pont Mitsui Polychemicals Co., Ltd.)
*2 Ethylene/methacrylic acid copolymer having zinc ion; Shore D hardness: 66 (a product of Du-Pont Mitsui Polychemicals Co., Ltd.)
*3 Ethylene/methacrylic acid copolymer having zinc ion; Shore D hardness: 62 (a product of Du-Pont Mitsui Polychemicals Co., Ltd.)
*4 Polybutadiene rubber having 97% of 1,4-cis structure and Mooney viscosity of 42 (a product of Japan Synthetic Rubber Co., Ltd.)
*5 Polybutadiene rubber having 98% of 1,4-cis structure and Mooney viscosity of 60 (a product of Enichem Japan Ltd.)
*6 Polybutadiene rubber having 98% of 1,4-cis structure and Mooney viscosity of 38 (a product of Shell Company)
*7 Master batch of vulcanizer comprising sulfur/Nocceler CZ/ZnO/Stearic acid/antioxidant = 1.5/1.5/3.0/2.0/1.0 (part by weight)
*8 Value obtained by dividing the viscosity of diene rubber by the viscosity of the ionomer resin (determination conditions: temp. 180° C., shearing rate: 1216/sec).
*9 The average size of the largest 10 particles selected from among optional 100 particles of diene rubber as determined by the image analysis in the observation with a transmission type electron microscope
*10 Injection-molded resin plates having a thickness of 2 mm were aged at 23° C. for 20 days, and the hardness of three plates put together was determined with a Shore D hardness meter at 23° C.
*11 The initial velocity of the golf ball obtained by striking the ball at a head speed of 43 m/sec with a swing robot and a driver (wood club #1) to the head speed; the value being a relative value as compared to the speed (100) obtained in Comparative Example 1.
*12 The number of times of the striking at a head speed of 43 m/sec with a swing robot and a driver (wood club #1) until the crack formation; the value being a relative value as compared to the number (100) obtained in Comparative Example 1; and the higher the value, the more excellent the durability.
*13 Feeling realized by striking with a driver (wood club #1) by a professional golfer
*14 The visual observation of the ball surface after the coating.
*15 tan $\delta$ value determined with a dynamic viscoelasticity meter under conditions comprising a twisting mode, frequency of 10 Hz, distortion of 0.5%, temperature of 0° C. and sample thickness of 2 mm.
*16 Isoprene rubber having Mooney viscosity of 70 (a product of Nippon Zeon Co., Ltd.)

TABLE 2

| | Comparative Example | | | | | | |
|---|---|---|---|---|---|---|---|
| | 1 | 2 | 3 | 4 | 5 | 6 | 7 |
| Himilan 1605 | 70 | 95 | 40 | 80 | | | 80 |
| Himilan AM7316*17 | 30 | | | | | | |
| Himilan 1702*18 | | | | | 80 | | |
| Himilan 1706 | | | | | | 80 | |
| JSR BR01 | | 5 | 60 | 20 | | | |
| Neocis BR60 | | | | | 20 | | |
| Cariflex BR-1220V | | | | | | 20 | |
| Nipol NS-116*19 | | | | | | | 20 |
| Titanium dioxide | 1 | 1 | 1 | 1 | 1 | 1 | |
| Vulcanizing agent | | 0.5 | 5.4 | 1.8 | 1.8 | 1.8 | |
| Mixer | twin-screw | twin-screw | twin-screw | single-screw | twin-screw | twin-screw | twin-screw |
| Viscosity ratio | | 1.6 | 1.6 | 1.6 | 0.8 | 6.0 | 3.0 |
| Particle size of diene rubber ($\mu$m) | | 1 | 5 | 10 | immiscible | 8 | 5 |
| Hardness of covering material | 60 | 65 | 43 | 56 | | 55 | 57 |
| tan $\delta$ (0° C.) | 0.090 | 0.042 | 0.062 | 0.050 | | 0.063 | 0.088 |
| Resilience index | 100.0 | 102.4 | 100.0 | 101.6 | | 100.8 | 100.1 |
| Durability index | 100 | 90 | 150 | 60 | | 60 | 110 |

TABLE 2-continued

| | Comparative Example | | | | | | |
|---|---|---|---|---|---|---|---|
| | 1 | 2 | 3 | 4 | 5 | 6 | 7 |
| Feeling realized by striking | soft | hard | excessively soft | soft | | soft | soft |
| Appearance | good | good | good | no good | | no good | good |

Notes)
*[17]Ethylene/methacrylic acid/methacrylic ester copolymer having zinc ion; Shore D hardness: 34 (a product of Du-Pont Mitsui Polychemicals Co., Ltd.)
*[18]Ethylene/methacrylic acid copolymer having zinc ion; Shore D hardness: 62 (a product of Du-Pont Mitsui Polychemicals Co., Ltd.)
*[19]Styrene/butadiene rubber having Mooney viscosity of 45 (a product of Nippon Zeon Co., Ltd.)
Resilience index and durability index of Comparative Examples 2 to 7 were shown respectively in comparison with Comparative Example 1 having each index of 100.

As shown in Table 2, the ionomer resins (Himilan 1605 and Himilan AM 7316) are used but no diene rubber is used in Comparative Example 1; the ionomer resin (Himilan 1605) and butadiene rubber (JSR BR 01) are used but the amount of the butadiene rubber is only small in Comparative Example 2; the butadiene rubber is used in a large amount in Comparative Example 3; the single-screw mixer is used for the mixing (shear rate: 500/sec) in Comparative Example 4; the viscosity ratio is below 1/1 in Comparative Example 5; the viscosity ratio is above 5/1 in Comparative Example 6; and tan δ is too large in Comparative Example 7.

It is apparent from Tables 1 and 2 that the compositions of the present invention (Examples 1 to 8) are superior to those in Comparative Examples 1 to 7 in the resilience and durability, and the feeling realized by striking the golf balls produced by using the former is softer than that realized by striking the golf balls produced by using the latter.

② According to the prescription (parts by weight) shown in the upper column in each of Tables 3 and 4, the components were melt-mixed with a twin-screw extruder at a shear rate of 2,000/sec and at a mixing temperature given therein.

Golf balls were produced by covering each solid core having a diameter of 38.3 mm and a compression value at 2.54 mm deformation of 80 kgf with the obtained composition (Examples 9 to 14 and Comparative Examples 8 to 13) by the injection molding to form a covering layer having a thickness of 2.2 mm. The resilience, durability, feeling realized by striking the golf ball, the appearance of the cover and coloring of the cover were evaluated to obtain the results given in Tables 3 and 4.

TABLE 3

| | Example | | | | | |
|---|---|---|---|---|---|---|
| | 9 | 10 | 11 | 12 | 13 | 14 |
| Himilan 1605 | 90 | 80 | 70 | 60 | 35 | 80 |
| Himilan 1706 | | | | | 35 | |
| JSR BR01 | 10 | 20 | 30 | 40 | 30 | |
| Nipol NS-218*[26] | | | | | | 20 |
| Titanium dioxide | 1 | 1 | 1 | 1 | 1 | 1 |
| Crosslinking agent*[20] | | | | | | |
| Mixing temperature (° C.,) | 180 | 180 | 180 | 180 | 180 | 180 |
| Formation of crosslinking of diene rubber*[21] | ○ | ○ | ○ | ○ | ○ | ○ |
| Hardness of covering material | 60 | 56 | 53 | 50 | 54 | 58 |
| tan δ (0° C.) | 0.043 | 0.046 | 0.048 | 0.050 | 0.047 | 0.050 |
| Particle size of diene rubber (μm) | 1 | 2 | 3 | 4 | 3 | 5 |
| Resilience index | 101.4 | 100.9 | 100.7 | 100.0 | 100.9 | 100.5 |
| Durability index | 95 | 100 | 105 | 115 | 105 | 95 |
| Feeling realized by striking*[22] | Δ | ○ | ○ | ▽ | ○ | ○ |
| Appearance*[23] | ○ | ○ | ○ | ○ | ○ | ○ |
| Coloring*[24] | ○ | ○ | ○ | ○ | ○ | ○ |

TABLE 3-continued

| | Example | | | | | |
|---|---|---|---|---|---|---|
| | 9 | 10 | 11 | 12 | 13 | 14 |

Resilience index and durability index of Examples 9 to 14 were shown respectively in comparison with Comparative Example 8 having each index of 100.

TABLE 4

| | Comparative Example | | | | | |
|---|---|---|---|---|---|---|
| | 8 | 9 | 10 | 11 | 12 | 13 |
| Himilan 1605 | 70 | 70 | 70 | 95 | 40 | 80 |
| JSR BR01 | 30 | 30 | 30 | 5 | 60 | |
| Nipol NS-116*[25] | | | | | | 20 |
| Titanium dioxide | 1 | 1 | 1 | 1 | 1 | 1 |
| Crosslinking agent*[20] | 1.8 | | | | | |
| Mixing temperature (° C.) | 180 | 270 | 140 | 180 | 180 | 180 |
| Formation of crosslinking of diene rubber*[21] | ○ | ○ | x | ○ | ○ | ○ |
| Hardness of covering material | 52 | 56 | 51 | 65 | 43 | 58 |
| tan δ (° C.) | 0.045 | 0.044 | 0.050 | 0.041 | 0.061 | 0.088 |
| Particle size of diene rubber (μm) | 3 | 3 | 5 | 1 | 5 | 5 |
| Resilience index | 100.0 | 99.6 | 98.3 | 100.6 | 98.3 | 98.7 |
| Durability index | 100 | 85 | 90 | 70 | 120 | 85 |
| Feeling realized by striking*[22] | ○ | ○ | ▽ | | | ○ |
| Appearance*[23] | ○ | x | x | ○ | ○ | ○ |
| Coloring*[24] | x | x | ○ | ○ | ○ | ○ |

Resilience index and durability index of Comparative Examples 9 to 13 were shown respectively in comparison with Comparative Example 8 having each index of 100.
Notes)
*[20]Master batch of vulcanizer comprising sulfur/Nocceler CZ/ZnO/Stearic acid/antioxidant = 1.5/1.5/3.0/2.0/1.0 (part by weight)
*[21]The formation of the crosslinks was judged from the extraction of diene rubber or not in a toluene extraction test.
○: crosslinked
x: not crosslinked.
*[22] The feeling realized by striking by a professional golfer with a driver (wood club #1);
○: soft feeling
Δ: The ball was slightly hard, but the feeling was soft.
▽: The ball was slightly soft, and the feeling was soft.
The feeling was excessively hard.
The feeling was excessively soft.
*[23]The ball surface was visually observed after the coating.
x: The surface was fluffy and unsuitable for the the marketing.
○: The appearance was good.
*[24]x: The color was changed into that of the crosslinking agent.
°: The color was unchanged.
*[25]Styrene-butadiene rubber having Mooney viscosity of 45 (a product of Nippon Zeon Co., Ltd.)
*[26]styrene-butadiene rubber having Mooney viscosity of 45 (a product of Nippon Zeon Co., Ltd.)

As shown in Table 4, the sulfur vulcanizing agent is used in Comparative Example 8; the mixing temperature is not below 260° C. in Comparative Example 9; the mixing temperature is below 150° C. in Comparative Example 10; the amount of the butadiene rubber is only small in Comparative Example 11; the amount of the butadiene rubber is excess in Comparative Example 12; and although the ionomer resin and diene rubber are used, tan δ is too high in Comparative Example 13. As shown in Table 3, the crosslinking is conducted by heating without using any crosslinking agent in Examples 9 to 14.

It is apparent from Tables 3 and 4 that the compositions of the present invention (Examples 9 to 14) are superior to those in Comparative Examples 8 to 13 in the resilience, durability and appearance, and the feeling realized by striking the golf balls produced from them is soft. In particular, it is apparent that the resilience obtained in Example 10 is superior to that obtained in Comparative Example 8, while Example 10 is the same as Comparative Example 8 (wherein the sulfur vulcanizing agent is used) in the composition and mixing temperature except that the crosslinking is conducted by heating in the former.

As described above, the covering material composition of the present invention comprising the ionomer resin and the diene rubber, the diene rubber being dispersed in the ionomer resin, is capable of realizing a soft feeling by striking a golf ball produced from it and is improved in the durability, resilience and appearance.

According to the present invention, the composition having the above-described properties (feeling realized by striking, durability and resilience) can be easily obtained by mixing the ionomer resin with the non-crosslinked diene rubber to disperse the crosslinked diene rubber in the ionomer resin.

What is claimed is:

1. A covering material composition for a golf ball, comprising 50 to 90 parts by weight of an ionomer resin and 10 to 50 parts by weight of a crosslinked butadiene rubber dispersed therein, wherein the crosslinked butadiene rubber has been prepared by mixing the ionomer resin with non-crosslinked butadiene rubber at a shear rate of at least 1000/sec in a mixer and heating the mixture at a temperature in the range of 150° C. to below 260° C., and wherein the ratio of the viscosity of the non-crosslinked butadiene rubber to the viscosity of the ionomer resin at the mixing temperature is in the range of 1/1 to 5/1 (butadiene rubber/ionomer resin), wherein the crosslinked butadiene rubber has a particle size of not larger than 5 μm, wherein the butadiene rubber is not crosslinked with any crosslinking agent, wherein the composition has a tan δ at 0° C. of not above 0.07.

2. The composition of claim 1, wherein the ionomer resin has a Shore D hardness of at least 55 and below 80.

3. The composition of claim 1, wherein the composition has a Shore D hardness of 45 to 62.

4. A golf ball covered with the composition of claim 1.

5. A process for producing a covering material composition for a golf ball, the process comprising mixing 50 to 90 parts by weight of an ionomer resin with 10 to 50 parts by weight of a non-crosslinked butadiene rubber at a shear rate of at least 1000/sec in a mixer, wherein the ratio of the viscosity of the non-crosslinked butadiene rubber to the viscosity of the ionomer resin at the mixing temperature is in the range of 1/1 to 5/1 (butadiene rubber/ionomer resin); and heating the mixture at a temperature in the range of 150° C. to below 260° C. to crosslink the butadiene rubber, to produce a composition comprising the ionomer resin and the crosslinked butadiene rubber dispersed therein, wherein the composition has a tan δ at 0° C. of not above 0.07, wherein the butadiene rubber is not crosslinked with any crosslinking agent, wherein the crosslinked butadiene rubber has a particle size of not larger than 5 μm.

6. The process of claim 5, wherein the ionomer resin has a Shore D hardness of at least 55 and below 80.

7. The process of claim 5, wherein the composition has a Shore D hardness of 45 to 62.

* * * * *